July 3, 1956   P. A. McDOUGAL, SR., ET AL   2,752,864
BULKHEAD FOR SHIPPING COMPARTMENTS
Filed May 2, 1955   5 Sheets-Sheet 5
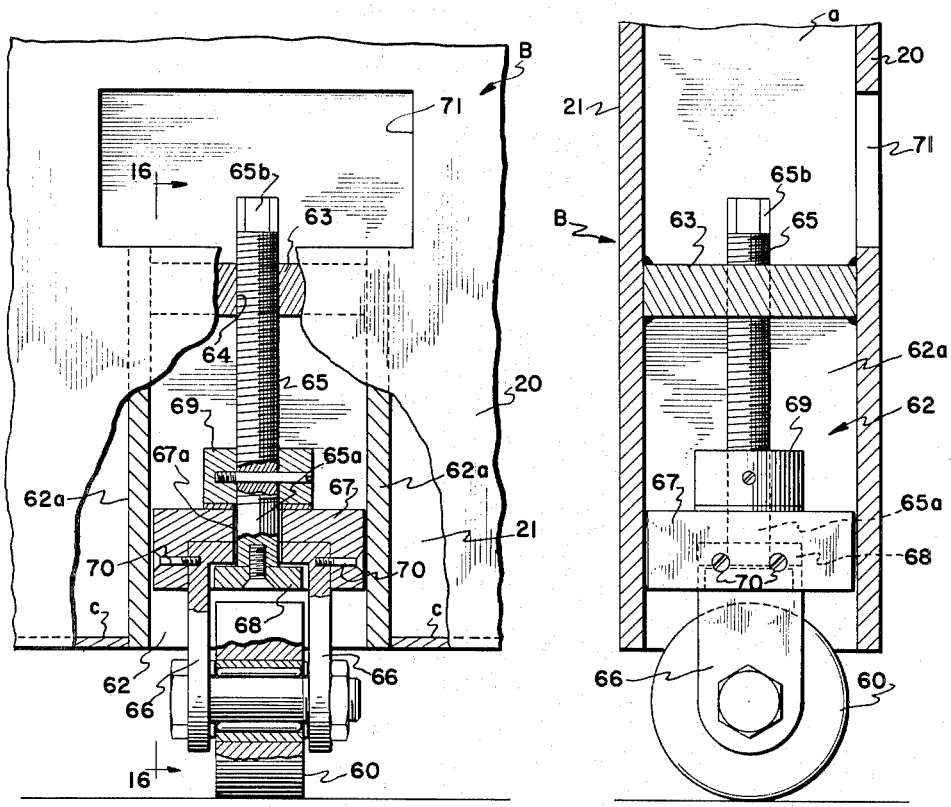
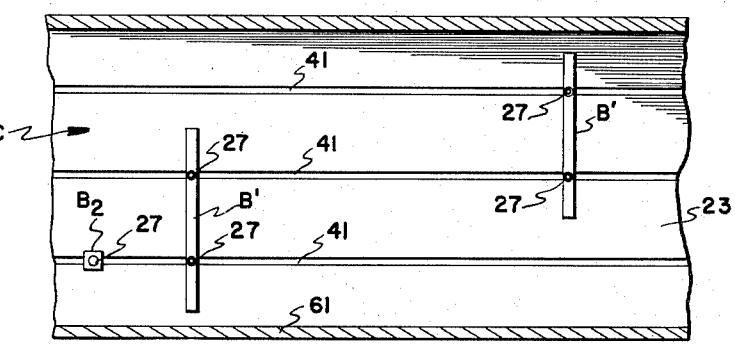
INVENTORS
PAUL A. MC DOUGAL, Sr.
FREDERICK G. SEELMANN
BY
ATTORNEY United States Patent Office 2,752,864
Patented July 3, 1956

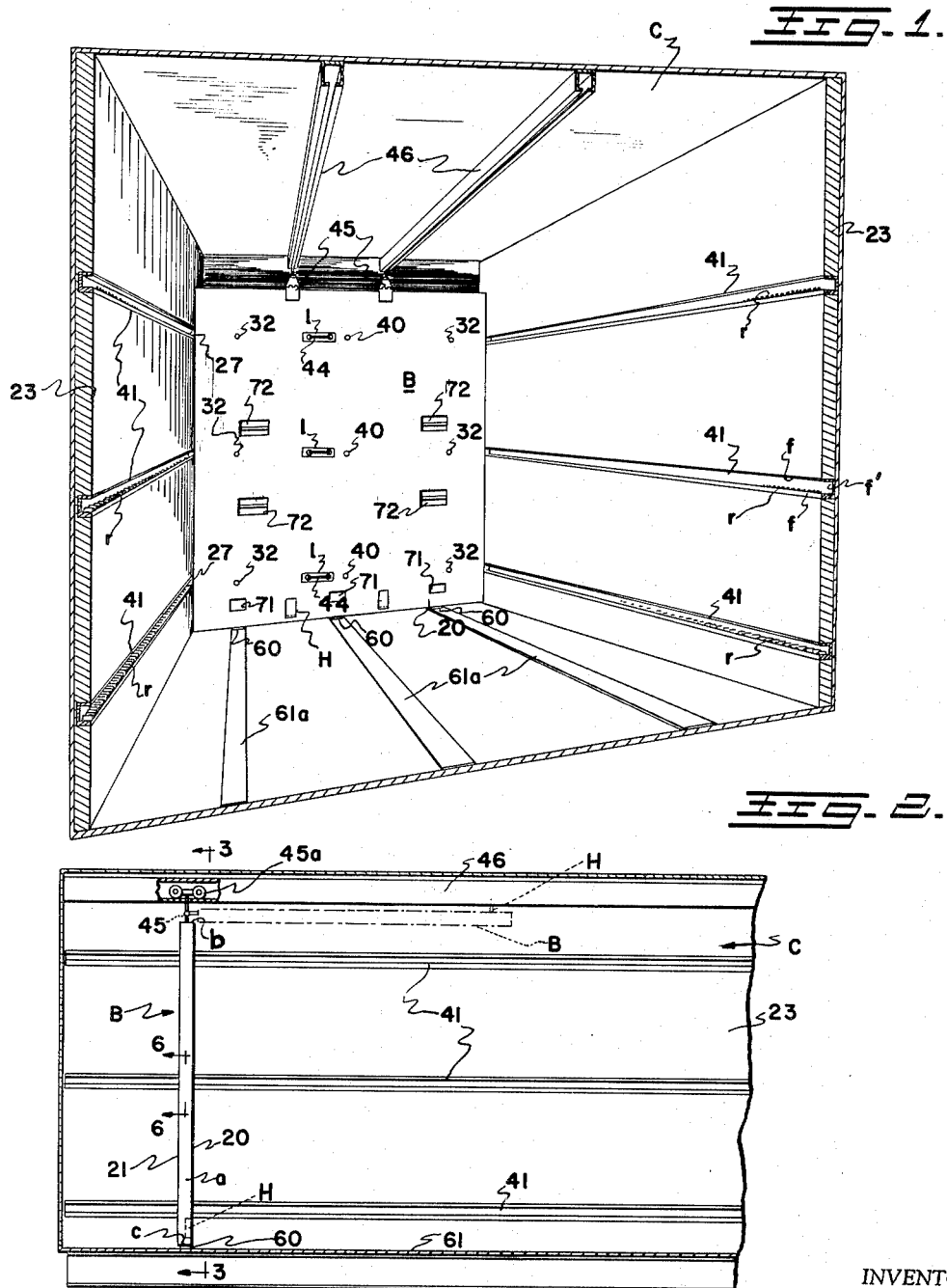

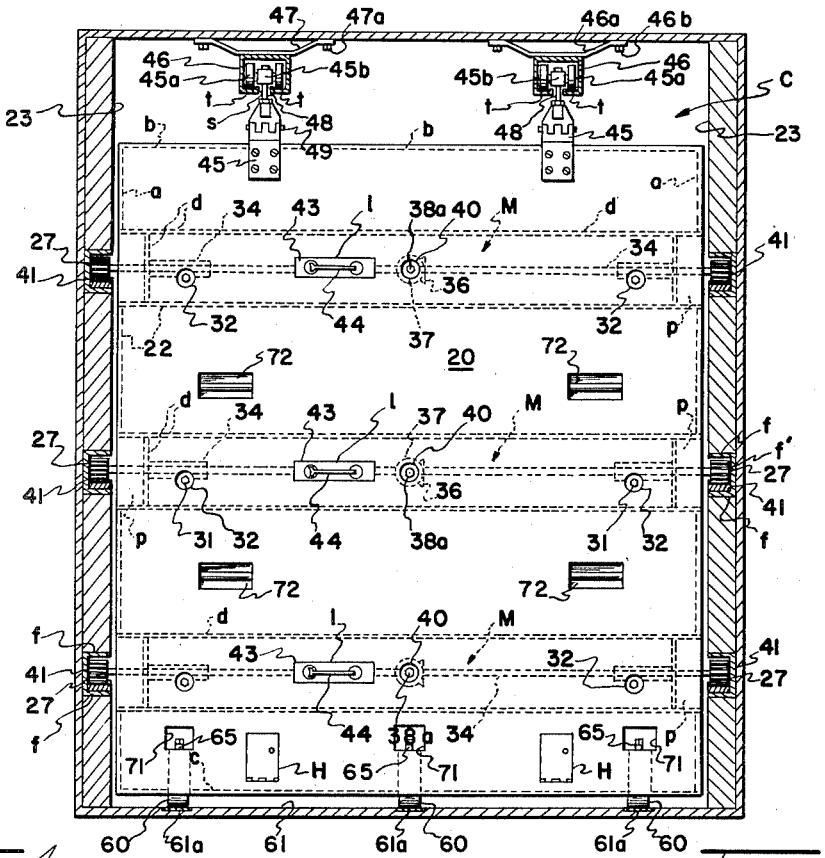
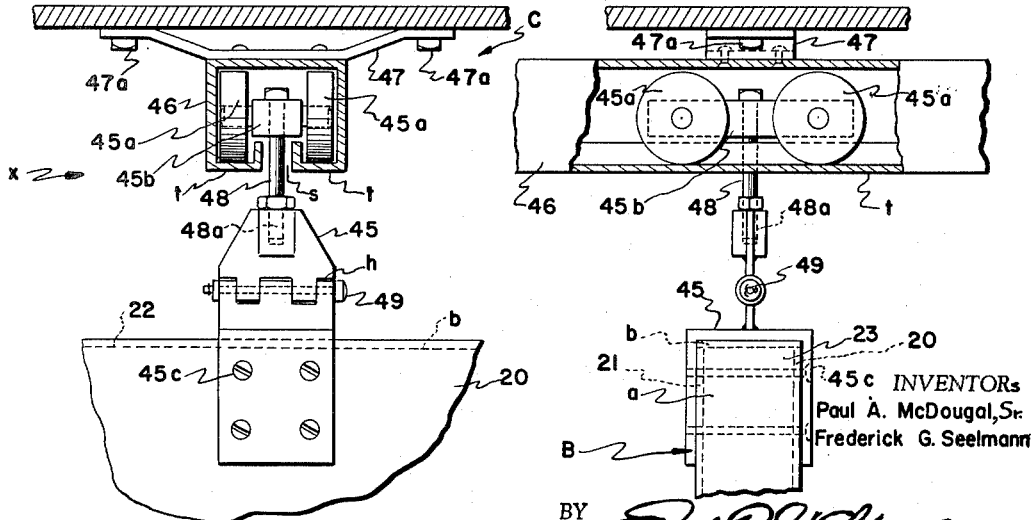

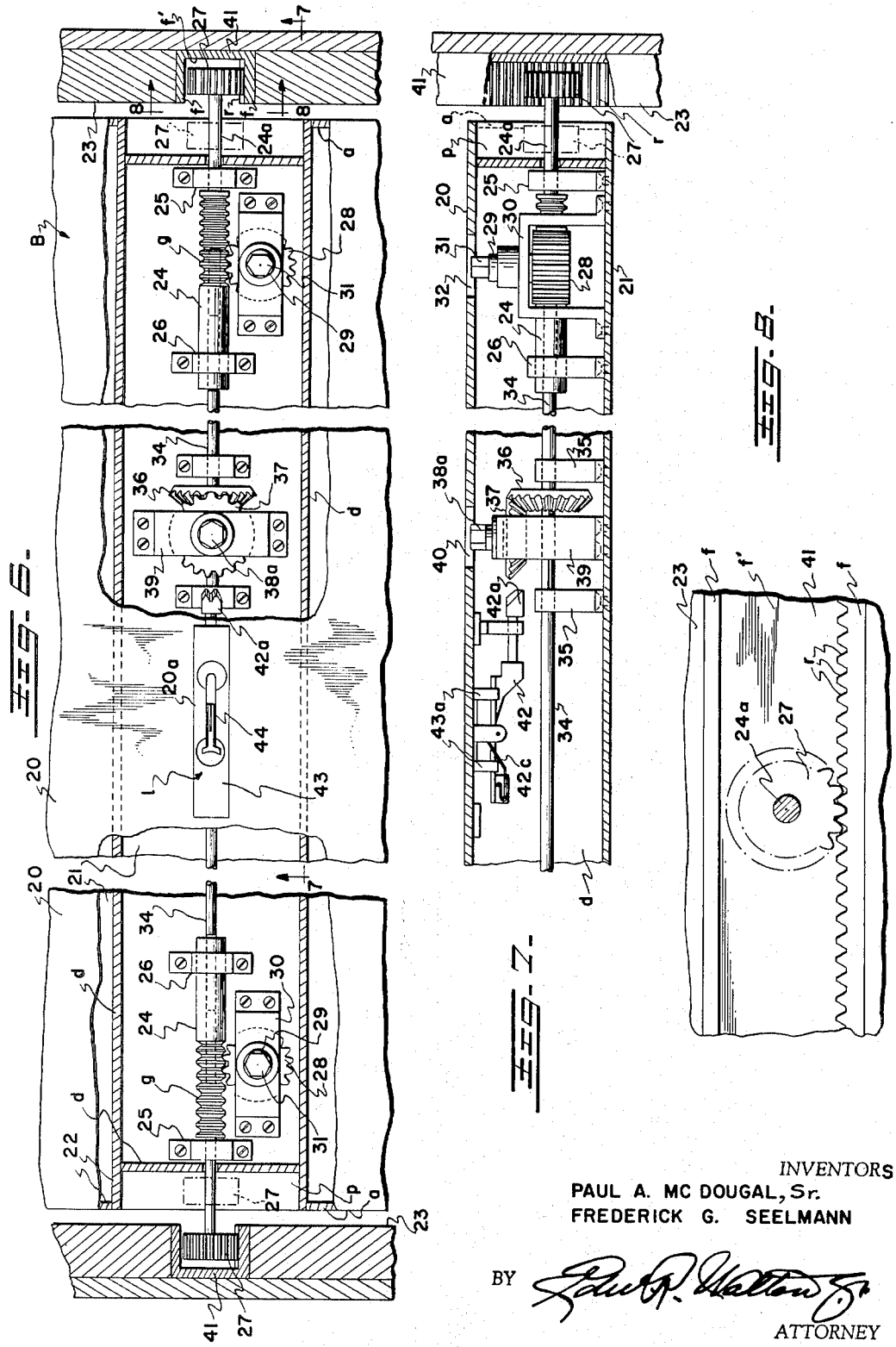

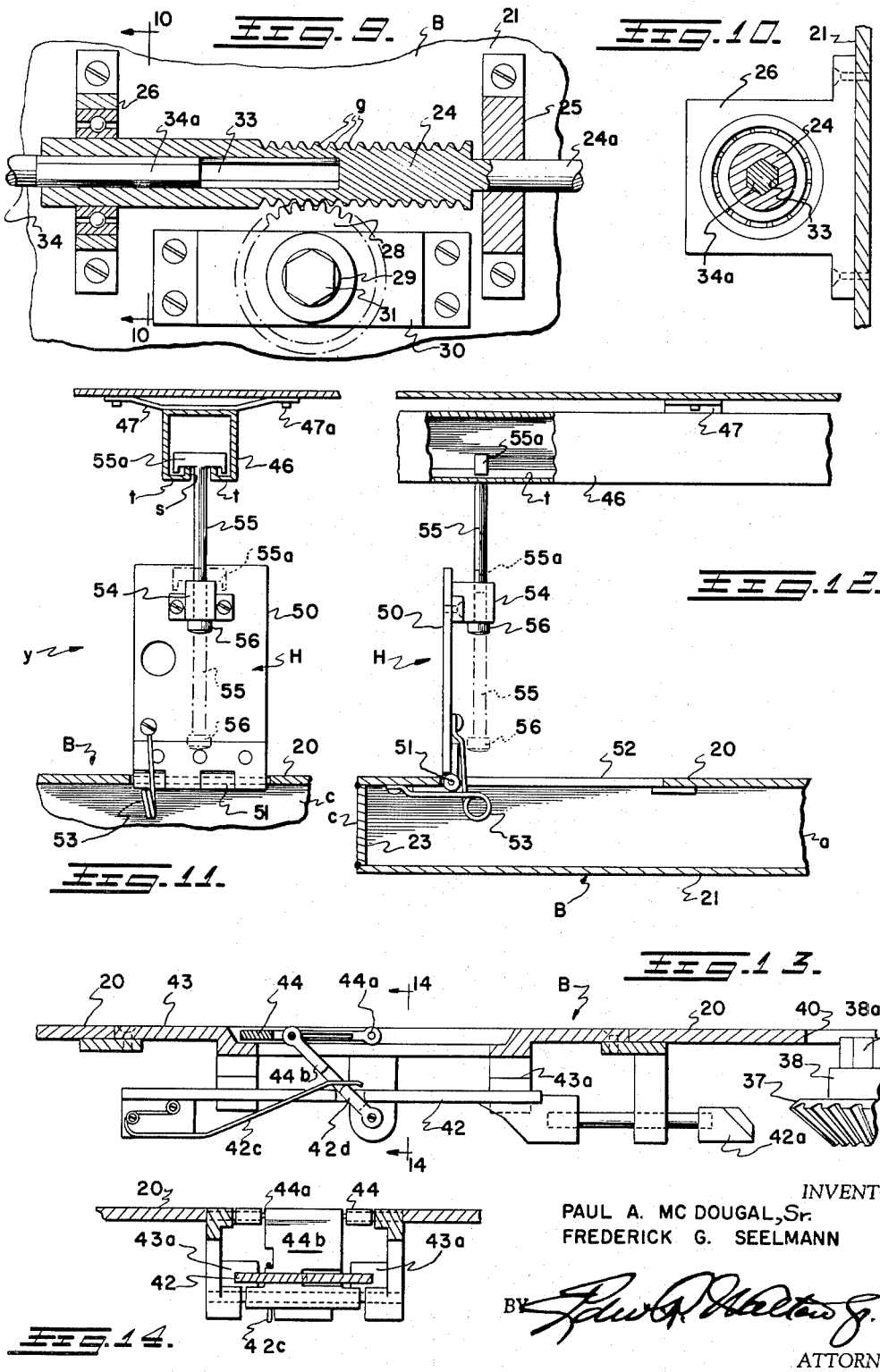

2,752,864

BULKHEAD FOR SHIPPING COMPARTMENTS

Paul A. McDougal, Sr., West Palm Beach, and Frederick G. Seelmann, Palm Beach, Fla.

Application May 2, 1955, Serial No. 505,326

15 Claims. (Cl. 105—376)

The present invention relates to movable and adjustable bulkheads for installation within shipping compartments of any kind, such as in freight or box railway car, motor vehicles, detachable van-bodies and ships, for maintaining the cargo, whether in less than car lots or otherwise or of any form, shape or size, in packed or loaded position, against shifting or other displacing movements that cause damage to the cargo and often to the car or shipping compartment.

While there have been many prior proposals in this respect, great damage is still occasioned by shifting cargo; and it is the prime object of the present invention to provide an improved bulkhead of the type indicated above which overcomes the frailties and disadvantages of prior proposals and which may be employed in connection with any type of lading.

Another object of the invention is the provision of a bulkhead of a simple but sturdy construction having incorporated therein novel means permitting it to be swung quickly into contacting position with respect to any type of cargo or lading at any position within the shipping compartments, then connected with the sides of the compartment and then finally brought into tight holding position relative thereto, with pressure if necessary, and at an angular position relative to the vertical as may be required, to hold the various articles of cargo in place against movement with respect to each other or to the compartment, during transit.

Still another object of the invention is the provision of a suspension means for said bulkhead by which it may be moved to any position in the length of the compartment, said means having novel features of construction permitting the bulkhead to be swung to and held in a horizontal position adjacent the ceiling or roof of the shipping compartment, during non-use or during loading and unloading.

With the above and other objects in view, the invention further includes the following novel features and details of construction hereinafter more fully described, illustrated in the accompanying drawings and pointed out in the appended claims.

In the drawings:

Figure 1 is a transverse section through a railway freight car equipped with the bulkhead of the present invention, this view showing the interior of approximately one-half of the car in perspective with the bulkhead at one end portion of the car in lowered lading-holding position;

Figure 2 is a fragmentary longitudinal sectional view through the freight car shown in Figure 1 and illustrating, in dotted line, the bulkhead raised to an overhead out-of-the-way position when not in use or during loading and unloading;

Figure 3 is an enlarged transverse sectional view taken through the freight car substantially on line 3—3 of Figure 2 and showing the bulkhead in elevation and the organizational arrangement;

Figure 4 is an enlarged detail view of the bulkhead suspending means;

Figure 5 is a view of the bulkhead suspending means looking in the direction of the arrow $x$ in Figure 4; and with a portion of the supporting trolley track broken away to illustrate the details of construction;

Figure 6 is an enlarged sectional view taken substantially on line 6—6 of Figure 2 and illustrating the positioning and locking means incorporated within the bulkhead for actuating the adjusting gears on opposite side-edges of the bulkhead and for moving said gears in and out of engagement with rack members on the side of the car or the like;

Figure 7 is a fragmentary sectional view taken substantially on line 7—7 of Figure 6;

Figure 8 is a fragmentary sectional view taken substantially on line 8—8 of Figure 6 and showing the adjustable connection between the bulkhead and side wall of the car or shipping compartment;

Figure 9 is an enlarged fragmentary sectional view of one of the mechanisms for shifting the adjusting gears into and out of engagement with respective rack members;

Figure 10 is a sectional view taken substantially on line 10—10 of Figure 9;

Figure 11 is an enlarged detail view illustrating a holding means for suspending the distal end of the bulkhead elevated from the support trolley track, when the bulkhead is in dotted line position in Figure 2;

Figure 12 is a view similar to Figure 11, but illustrating said holding means when viewed in the direction of the arrow $y$ in Figure 11;

Figure 13 is an enlarged detail view of a manually actuated means for locking the bulkhead adjusting means against movement;

Figure 14 is a sectional view taken substantially on line 14—14 of Figure 13;

Figure 15 is a fragmentary elevation of a portion of the bottom of the bulkhead with a part broken away to illustrate the adjustable mounting for supporting rollers;

Figure 16 is a vertical sectional view taken substantially on line 16—16 of Figure 15; and Figure 17 is a fragmentary sectional view through a vehicle body illustrating the use of modified forms of the bulkhead.

Referring in detail to the drawings, in which like characters refer to similar and like parts throughout the several views, the bulkhead B may be fabricated in any convenient manner with any type of material, but it is preferred that the same be of light weight durable material so that it may be readily and easily handled. Aluminum, because of its lightness in weight and strength, is very acceptable for this purpose.

The bulkhead is constructed preferably to form a solid partition transversely across the shipping compartment C of a suitable vehicle, such as a boxcar, van-body or the like, and has spaced and continuous outer walls 20 and 21 held in spaced relation and connected to a frame 22 comprising side rimming members $a$, top and bottom rimming members $b$ and $c$, and transverse reinforcing bracing and spacer plates $d$. The configuration of the bulkhead is to conform with the side, bottom and top walls of the compartment C with which it is to be used and, since these compartments are usually rectangular in cross section, the bulkhead has been so shown in the drawings and is dimensioned to be sufficiently spaced from said walls of the compartment to give adequate clearance for movement therebetween.

A plurality of vertically spaced mechanisms M are disposed transversely of the bulkhead B and between the facing or side plates 20 and 21 thereof and by which the bulkhead is secured to the side walls 23 of the compartment and adjusted relative thereto into lading retaining position. These mechanisms M are shown, particularly in Figures 1 and 3, as being disposed one across the horizontal center portion of the bulkhead, one adjacent the top, and one adjacent the bottom end of the bulkhead. In some instances, three of such mechanisms may not be necessary, and the center mechanism may be eliminated; or only the center mechanism may be employed and the upper and lower mechanisms may be omitted. However, any number of mechanisms M may be installed.

These mechanisms M each comprise two horizontally aligned arbors 24, one disposed adjacent each side edge portion of the bulkhead, respectively. Each arbor 24 is mounted near its ends in suitably spaced bearings 25 and 26, in which it is both longitudinally slidable and rotatable and has a reduced portion 24a, at its outer end, extending through the bearing 25 and having a pinion gear 27 fast thereon, as more clearly shown in Figures 6, 7 and 9. The pinion gear 27 is projected laterally from and retracted in to a pocket p in the side edge of the bulkhead by means of a gear 28 meshing with an intermediate portion of the arbor 24 provided with a plurality of circumferential grooves g to form a rack. The gear 28 is fast on a shaft 29 journalled in a U-shaped bracket 30 secured to the inner face of side wall or plate 21 of the bulkhead. The other end 31 of the shaft 29 is formed to receive a socket end of a crank handle, not shown, by which the gear 28 is actuated and which may be inserted through an opening 32 in the other side wall or plate 20 of the bulkhead. The inner end of each of the arbors 24 is provided with a longitudinally extending internal bore 33 to slidably, but non-rotatably, receive an end 34a of a connecting shaft 34 extending between said arbors 24 and by which the arbors may be rotatable in either direction. The end 34a of the shaft and the bore 33 may be polygonal, as shown, or may be otherwise suitably splined. The shaft 34 is suitably supported along its length by bearing brackets 35 and has a bevelled gear 36 fast thereon, preferably disposed substantially centrally of the shaft, and meshing with a bevelled gear 37 fast on a stud shaft 38 carried in a U-shaped journal bracket 39 (similar to the journal bracket 30). The outer end of the stud shaft 38 is formed with a socket-receiving extension 38a onto which a socket of a crank handle, not shown, may be applied through an opening 40 in the plate 20 of the bulkhead to rotate the shaft 34 and hence the arbors 24.

It will thus be seen that, by a suitable rotation of the shafts 29, the arbors 24 may be moved axially in their bearing brackets 25 and 26 so as to project the pinions 27 from their dotted line position (Figures 6 and 7) within the confines of their pockets p in the bulkhead beyond the side-edge portions of the bulkhead into engagement with track-guides 41, in the form of rack-bars, disposed horizontally on the side walls 23 of the compartment C and in a position to receive the same, and, by reverse rotation of the shafts 29, the arbors may be moved inwardly to retract the pinion 27 into said pockets of the bulkhead. It will also be observed from the above description and the drawings that the arbors 24 may be rotated in either direction by the shaft 34 upon suitable operation of the stud shaft 38.

Each mechanism M is provided with a lock means l for holding its shaft 34, and hence its arbors 24, against rotation. The lock means l comprises a sliding lock-bolt 42 mounted in suitable guides 43a carried on the inner face of a plate 43 set into and closing an opening 20a in the bulkhead wall or plate 20, said opening and plate 43 being positioned so that the detent end of the lock-bolt may be brought into and out of engagement with the gear 37 (Figures 1, 3, 6, 7, 13 and 14). The detent end of the locking bolt 42 is preferably provided with a segment of gear teeth 42a adapted to mesh with the teeth of the gear 37. The lock-bolt 42 is shifted into and out of locking position by a hand-lever 44 pivoted at 44a to the plate 43 and has a finger 44b positioned to operate in a socket 42b on the lock-bolt, whereby, when the lever 44 is swung from one side to the other side of its pivot against the outer face of the plate 43, the lock-bolt is moved into or out of engagement with the gear 37 and is positively held in either of its positions, by reason of the position of finger 44b in the socket 42b and the members 42c and 42d.

The trackways 41 are, preferably, composed of channel-form members embedded into the side walls 23 of the shipping compartment C with their open sides opening into the compartment and their side flanges or legs f horizontally extending one above the other, the lower flanges having their inner faces formed with rack-teeth r designed to mesh with the teeth of the pinions 27. These flanges f of the trackways 41 are spaced sufficiently to receive the pinions 27 therebetween and so that the upper flange will act to retain the pinion 27 in engagement with the rack-surface r on the lower flange, thus preventing the pinions from jumping or moving out of engagement with said rack-teeth.

The upper end portion of the bulkhead B may be provided with one or more—two being shown herein—hanger-trolleys 45 supported from and movable along a supporting trolley-track 46 secured to the ceiling of the compartment and extending longitudinally thereof. Each trolley-track comprises an inverted channel-form member extending longitudinally of the ceiling of the shipping compartment and removably secured thereto in any suitable manner, for instance as by bracket arms 47 and bolts 47a. The outer ends of the depending legs of the channel, forming the trolley track 46, are inturned for a distance to form spaced track-members t separated by a slot s and, over which track-members t, spaced rollers 45a of the hanger trolley move. The rollers 45a are journalled on a carriage frame 45b from which an elongated bolt 48 extends through the slot s and has an adjustable threaded connection, as at 48a, with one leaf of a hinge member h, the other leaf of the hinge member being secured to the upper end portion of the bulkhead as at 45. The leaves of said hinge are removably connected by a hinge pin 49 which permits the bulkhead to be readily disconnected from the shipping compartment C.

The lower distal end of the bulkhead is provided with one or more devices H for holding the bulkhead in a horizontal position, when swung adjacent the ceiling of the shipping compartment, as shown more particularly in dotted lines in Figure 2 and in Figures 11 and 12. There may be as many of these holding devices H as there are trolley supporting tracks 46; and each of said holding devices is positioned at the distal edge portion of the bulkhead so as to be brought into alignment with said track when the bulkhead is in its horizontal position. Each of the holding devices comprises a plate 50 having its lower edge hinged, as at 51, to the lower edge of an opening 52 in the plate 20 of the bulkhead. The plate 50 is designed to close the opening 52 when the holding device is not in use; and, to this end, a spring 53 may be provided to bias and hold the plate 50 in its closed position. The inner face of the plate 50 has mounted thereon a bracket 54 in which is slidably mounted an elongated rod 55 having a T-shaped head 55a at one end adapted to be inserted in the slot s between the track-flanges t of the trolley support 46 and, then, rotatable at about forty-five degrees to engage and rest upon the track-flanges t of the trolley support. The other end portion of the bolt 55 is enlarged to form an abutment stop 56 to prevent the rod 55 from being withdrawn from the bracket 54.

When it is desired to lower the bulkhead from its inoperative horizontal position (dotted lines in Figure 2) to a vertical position, the distal end of the bulkhead is raised slightly to relieve its weight from the rod 55, which is then slightly raised and turned, about forty-five degrees from the position shown in Figures 11 and 12, and withdrawn from the supporting trolley track 46. The bolt will then slide to the dotted line position shown in Figures 11 and 12 and the plate 50 will be moved to closed position by the spring 53. The bulkhead may then be permitted to swing to a desired vertical position (shown in Figures 1, 2 and 3). In this vertical suspended position, the bulkhead will then be moved along the trolley track 46 toward the cargo which it is to retain against shifting movement in the shipping compartment C during transit. At this point in the placement of the bulkhead B into position, crank handles (not shown) are inserted through openings 32 of one of the mechanisms M to rotate the stud shafts 29 in a direction to project the pinions 27 into the adjacent cooperating guide-trackways 41. With this accomplished, the bulkhead, then, may not be in sufficiently tight contacting engagement with the lading or cargo to prevent its shifting, during transit, and, in such event, is moved into such position by rotating the shaft 38 (by inserting a crank-handle through the opening 40) to cause pinions 27 to travel over the rack r of the trackways to bring the bulkhead into proper relation with the lading or forcibly press tightly thereagainst as the case may require. When the bulkhead has been thus positioned in proper relationship with the cargo to be retained thereby, the handle 44 of the locking device l is manually actuated to slide bolt 42 to move its detent end 42a into engagement with the bevel gear 37, thus locking and retaining it, and hence the pinions 27, in their adjusted position against movement. In order to avoid any lateral or sideways movement of the bulkhead relative to the walls 23 of the shipping compartment C, which movement may be caused by swaying and vibration of said compartment during transit, the pinions 27 are then adjusted or moved outwardly to bring their outer faces into tight contacting engagement with the opposing faces of the closed walls f' of the channel-form guide trackways 41, as shown in Figure 3.

Ordinarily, in most instances, the bulkhead B will be vertically positioned in its cargo-retaining position and, after it has been adjusted as above described, the pinions 27 of the other locking and adjusting mechanisms M, if any, will be projected into their guide-trackways 41 and locked, in the manner just described, to give additional strength and stability to the bulkhead. However, the arrangement of the mechanisms M is such that only one may be employed in connection with the loading of certain cargo so as to permit the bulkhead to assume an angular position with respect to the vertical, when desirable or necessary, and in such case the horizontally disposed mechanism M will be positioned substantially centrally of the bulkhead B. But, as shown and previously described, the bulkhead may be constructed with more than one of the locking and adjusting mechanisms M as may be found necessary in connection with any type of cargo with which the bulkhead is to be used.

When the cargo is to be unloaded, the locking mechanisms M may be reversely operated to withdraw the pinions 27 and the distal end of the bulkhead swung into the position shown in Figure 2 to be retained out of the way adjacent the ceiling of the compartment and maintained in that position by the holding device H.

In some instances, it may be desirable to provide supporting rollers 60 at the bottom edge of the bulkhead B in order to give additional support and stability thereto and, further, to relieve the pinions 27 and their arbors 24a of any of its weight. Two or more of such rollers 60 may be provided at selected positions with respect to the bulkhead for the purpose just mentioned and as shown in Figures 1, 2, and 3. The rollers 60 are each vertically adjustable so that they may be independently positioned to be in proper supporting contact with the floor 61 of the compartment C, when the bulkhead is in its vertical position. Runner-strips 61a may be provided to form a smooth surface over which the rollers 60 may roll.

It is preferred that the assembly for adjustably mounting the rollers 60 be housed between the face plates 20 and 21 of the bulkhead so as to eliminate all exterior projections except that the rollers project a sufficient distance from the bottom of the bulkhead to operatively engage with the floor 61, the arrangement being such that the rollers may be removed from the bulkhead through its bottom edge for replacement or repair.

To this end, an inwardly extending polygonal recess 62 is provided for each roller 60 in the lower or bottom end of the bulkhead B, as shown in detail in Figures 15 and 16, by spaced partition member 62a interposed between and secured to the outer walls 20 and 21 of the bulkhead and which extend from an opening in the rimming member c for a distance inwardly of the bulkhead. A header bar or plate 63 extends between and normal to the inner ends of the members 62a and is secured to the latter. The header 63 has a threaded rod 65 having its outer end swivelly connected to a roller yoke 66 slidably and non-rotatably disposed in the recess 62. One manner of so mounting the yoke 66 is to provide a block 67 having a sliding fit with the walls of the recess 62 and having a non-threaded opening 67a therein through which a non-threaded portion of the outer end 65a of the rod 65 rotatably extends, the outer extremity of the rod 65 having a cap 68 removably secured thereto and of greater dimension than the diameter of the opening 67a. A stop-collar 69 is fixedly disposed on the rod 65 to lie on the inner side of the block 67 to contact and receive the load thrust from the block 67, when the roller 60 is in contact with the floor 61. The roller yoke members 66 are removably secured to the block 67, as at 70.

The outer wall 20 of the bulkhead is formed with an access opening 71 above the header 63 so that a suitable tool may be inserted thereinto to engage the inner end 65b of the rod 65 for effecting adjustment of the roller 60. The rod 65 is a sufficient length so that the block 67 may be moved beyond the open end of the recess to allow removal of the roller assembly.

When the bulkhead is equipped with rollers 60, the hangers 45 and their trolley-tracks may not be employed in some situations in the use of the bulkhead, thus enabling the upper end of the bulkhead to extend closer to the top of the compartment C. In such cases, the bulkhead can be easily handled and moved about by means of the recessed handle-grips 72, preferably, flush with the walls 20 and 21.

As alluded to above, the bulkhead may employ one or more of the adjusting and locking mechanisms M. Therefore, the bulkhead of this invention may be made and used in smaller or sectional dimension, as indicated at $B^1$ and $B^2$, in Figure 17, in order to afford security to cargo in all types of shipping compartments or when the merchandise is stagger-stacked, as illustrated. In this form of the invention, the bulkheads $B^1$ will be of such vertical dimension as to extend between two adjacent trackways 41 and will have only two mechanisms M, one at or adjacent its upper and lower ends, respectively, and may not be provided with hangers 45 or supporting rollers 60; but in all other respects the bulkhead $B^1$ will be the same as previously described.

The modified bulkhead $B^2$ is of the bar or beam type and consists of one mechanism M housed between plate members 20, 21 and 22 of dimensions sufficient only to encase the mechanism M.

From the above, it will be observed that the objects of the present invention are attained by the device device described and shown, that the bulkhead can be adjusted with nicety with respect to the cargo, to be retained thereby, with a minimum of effort and that the mechanism for locking and adjusting the bulkhead into its retaining position is sturdy and sure in its operation and is well protected by being incorporated in the structure of the bulkhead itself.

Having thus described the invention and the manner in which the same is to perform, it is to be understood that the exact structure herein shown and described may be modified or changed in various manners obvious to those skilled in the art and, therefore, we are not to be limited to the exact structure shown and described but only by the scope of the appended claims.

That which is claimed, as new and to be secured by Letters Patent, is:

1. A bulkhead for shipping compartments of freight cars, vans or the like having rack-bars supported on the walls thereof, said bulkhead comprising a partition-form member dimensioned to extend between opposite walls of said compartment, pinions disposed and journalled within the confines of and on opposite sides of said bulkhead and mounted for axially slidable movement, actuatable means on the bulkhead and operatively connected with said pinions for projecting said pinions beyond said bulkhead into engagement with said rack-bars and for retracting said pinions into said bulkhead and for rotating said pinions thereby to adjust said bulkhead in relation to lading within said compartment.

2. The subject-matter of claim 1 wherein each of said pinions is carried by an arbor journalled and axially slidable in bearings on the bulkhead, and each arbor has a rack thereon; and wherein the means for projecting and retracting said pinions is a gear for and meshing with each rack and journalled on the bulkhead, and wherein the means for rotating said pinions comprises a shaft extending between two oppositely positioned arbors and having a sliding-keyed connection therewith, and means for rotating said shaft.

3. The subject-matter of claim 1 wherein there is a plurality of said rack-bar engaging pinions arranged at spaced distances along each side-edge of said bulkhead, each pinion on one side being in substantial alignment with an opposite pinion on the other side of said bulkhead; and rotatably mounted shafts, one extending between each pair of oppositely positioned pinions and having splined connections with the axes thereof, and means for rotating said shafts.

4. The subject-matter of claim 1 wherein there are rollers disposed at the bottom edge of said bulkhead to movably support the bulkhead, and means carried by the bulkhead and mounting said rollers for adjustment vertically relative to said bulkhead to position said pinions in alignment with their rack-bars, when the bulkhead is in vertical position, and to relieve the weight of the bulkhead from said pinions, when the latter are in engagement with said rack-bars.

5. The subject-matter of claim 4 wherein the said rollers and their adjustable mounting means are housed within the bulkhead except for such portion of the roller having traction with the floor of the compartment.

6. The subject-matter of claim 1 wherein the bulkhead is composed of two flat substantially coextensive surfaces spaced apart by spaced bracing members, pockets formed between said surfaces of the bulkhead and along the side edges thereof to receive said pinions, said actuating means for projecting and retracting and for rotating said pinions being disposed and mounted between said spaced surfaces of the bulkhead and accessible through openings in one of said surfaces for operation.

7. The subject-matter of claim 6 wherein said actuatable means for said pinions are arbors fast to said pinions, respectively, and journalled for axially slidable movement in bearings on said bulkhead, said arbors each having a rack thereon extending circumferentially thereof, and a gear for and meshing with each rack and journalled on and within the bulkhead and having an axial portion accessible through an opening in the bulkhead surface for detachable engagement with a cranking implement.

8. The subject-matter of claim 7 wherein a shaft is rotatably mounted on the bulkhead and extends between a pair of said arbors with its end portions having a connection with said arbors for rotating the arbors and permitting said axial movement of said arbors, and means for rotating said shaft.

9. The subject-matter of claim 8 wherein said means for rotating said shaft is within said bulkhead and accessible through an opening in said bulkhead, and a lock means carried by said bulkhead for locking said shaft against rotation.

10. The combination of a shipping compartment of freight cars, vans, ships, and the like having elongated rack-bars supported horizontally on the side walls thereof; abutments along the outboard edges of said rack-bars; an adjustable bulkhead dimensioned to extend between said opposite walls of said compartment to retain cargo in position therein during transit; pinions disposed at and rotatably journalled on opposite side edge portions of said bulkhead and mounted for axial movement into and out of engagement with said rack-bars; means carried by the bulkhead for actuating said pinions, to move said pinions into and out of engagement with said rack-bars, to move said bulkhead into and out of cargo-retaining position and to move said pinions into binding contact with said abutments to prevent edgewise movement of the bulkhead, when it has been adjusted into cargo-retaining position; and means carried by said bulkhead for locking said bulkhead in its adjusted position.

11. The subject-matter of claim 10 wherein there are a plurality of rollers spaced along the lower end of said bulkhead to engage the floor of said compartment and to movably support the bulkhead, when in its vertical position, and means adjustably mounting said rollers on said bulkhead for adjustment to-and-fro relative to its lower end, said rollers and their mounting means being housed within the confines of said bulkhead except for such portion of the rollers having traction with said floor of the compartment.

12. In an adjustable bulkhead for shipping compartments of freight cars, vans, ships and the like for retaining cargo against movement during transit, horizontally disposed channel-form trackways to be secured to opposite walls of a shipping compartment with their channel-bottoms extending vertically and substantially in the same plane as said walls of the compartment, rack teeth on the inner faces of the lowermost leg of each trackway, a bulkhead member adapted to extend between said opposite walls of the compartment, a single pinion disposed at and rotatably journalled on each opposite side edge portion of said bulkhead for engagement with each adjacent trackway, respectively, and mounted for axial movement into and out of the channels of said trackways, said pinions and the legs of said channel trackways being dimensioned so that said legs of each trackway retain the pinion therebetween in mesh with said rack-teeth when said pinions are positioned therebetween, means carried by the bulkhead for actuating said pinions in their said movements and to bring the pinions into tight contact with the bottom walls of said channel trackways, when the bulkhead has been adjusted to cargo-retaining position, whereby to prevent lateral edgewise movement of the bulkhead.

13. A device for retaining cargo against shifting movement within a shipping compartment which latter has elongated rack-bars secured to the inner faces of opposing walls thereof, the improvement being that said retaining device is a barrier-member separable from the compartment and dimensioned to extend between said opposing walls of the compartment, rack-bar engaging pinions disposed at and rotatably journalled on opposite portions of said barrier-member for engagement with and to travel along adjacent rack-bars, actuatable means carried by the bulkhead for moving said pinions laterally of the device into and out of engagement with said rack-bars, whereby the barrier-member may be adjusted into cargo-retaining position when said pinions are in engagement with said rack-bars, and means carried by the device for locking said pinions against rotation, whereby said barrier-member may be held in adjusted cargo-retaining position.

14. The subject-matter of claim 13 wherein the pinion actuating means is housed within said barrier-member and said barrier-member is formed with pocket recesses into which said pinions may be withdrawn when moved out of rack-bar engaging position, whereby to facilitate the positioning of the device between opposing side walls of the compartment and to protect said pinion when the device is not in use.

15. The subject-matter of claim 13 wherein said barrier-member extends vertically of the compartment and has at least two of said pinions at spaced intervals along each of its side edge portions, rollers disposed at the bottom edge of said device to movably support it while being positioned between and removed from between said opposing walls of the compartment, and means adjustably mounting said rollers to said barrier-member for vertical adjustment of said rollers relative to said barrier-member to position said pinions for their engaging movement with said rack-bars.

References Cited in the file of this patent

UNITED STATES PATENTS

| | | |
|---|---|---|
| 753,162 | Riley | Feb. 23, 1904 |
| 1,388,819 | Moriarity | Aug. 23, 1921 |
| 1,453,986 | Miller | May 1, 1923 |
| 1,825,452 | Harris | Sept. 29, 1931 |
| 2,005,086 | Jones | June 18, 1935 |
| 2,287,852 | Zyara | June 30, 1942 |
| 2,612,122 | Peterson | Sept. 30, 1952 |
| 2,677,244 | Wehby | May 4, 1954 |